US012603431B2

(12) United States Patent
Kong et al.

(10) Patent No.: US 12,603,431 B2
(45) Date of Patent: Apr. 14, 2026

(54) ANTENNA ELEMENT AND ANTENNA ARRAY

(71) Applicant: ZTE CORPORATION, Shenzhen (CN)

(72) Inventors: Shengwei Kong, Shenzhen (CN); Li Bu, Shenzhen (CN); Shuiping Liu, Shenzhen (CN); Rongli Wang, Shenzhen (CN); Qixu Yang, Shenzhen (CN); Weiming Xu, Shenzhen (CN); Zhibin Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 211 days.

(21) Appl. No.: 18/687,815

(22) PCT Filed: Aug. 30, 2022

(86) PCT No.: PCT/CN2022/115985
§ 371 (c)(1),
(2) Date: Feb. 29, 2024

(87) PCT Pub. No.: WO2023/030342
PCT Pub. Date: Mar. 9, 2023

(65) Prior Publication Data

US 2025/0125527 A1 Apr. 17, 2025

(30) Foreign Application Priority Data

Sep. 6, 2021 (CN) ......................... 202111040176.6

(51) Int. Cl.

| | |
|---|---|
| ***H01Q 5/378*** | (2015.01) |
| ***H01Q 1/12*** | (2006.01) |
| ***H01Q 9/04*** | (2006.01) |

(52) U.S. Cl.
CPC ........... *H01Q 5/378* (2015.01); *H01Q 1/1207* (2013.01); *H01Q 9/0414* (2013.01)

(58) Field of Classification Search
CPC .... H01Q 5/378; H01Q 1/1207; H01Q 9/0414; H01Q 1/246; H01Q 21/0081; H01Q 21/08
See application file for complete search history.

(56) References Cited

U.S. PATENT DOCUMENTS

2023/0318182 A1* 10/2023 Liu ........................ H01Q 5/342 343/848

FOREIGN PATENT DOCUMENTS

| | | |
|---|---|---|
| CN | 105958195 A | 9/2016 |
| CN | 207009632 U | 2/2018 |

(Continued)

OTHER PUBLICATIONS

Translation of CN 111063996 A (Year: 2020).*

(Continued)

*Primary Examiner* — Renan Luque
(74) *Attorney, Agent, or Firm* — NZ Carr Law Office

(57) ABSTRACT

Embodiments of the present application relate to the technical field of communication, and disclose an antenna element and an antenna array, the antenna element including a dielectric substrate (10), a radiation unit (20) and a feed unit (30); a first support column (11) is provided on the dielectric substrate (10); the radiation unit (20) and the feed unit (30) are an integrally formed structure, at least one of the radiation unit (20) and the feed unit (30) being provided with a first through hole (21), the first support column (11) passing through the first through hole (21), and the first support column (11) and an inner wall of the first through hole (21) being fixedly connected by means of hot melting.

14 Claims, 6 Drawing Sheets

(56) References Cited

FOREIGN PATENT DOCUMENTS

| | | | | | |
|---|---|---|---|---|---|
| CN | 108987947 | A | | 12/2018 | |
| CN | 111063996 | A | * | 4/2020 | ............. H01Q 21/24 |
| CN | 111490317 | A | | 8/2020 | |
| CN | 212303916 | U | | 1/2021 | |
| CN | 112787081 | A | | 5/2021 | |
| CN | 112864600 | A | | 5/2021 | |
| CN | 113140898 | A | * | 7/2021 | ............... H01Q 1/38 |
| JP | 2007221513 | A | | 8/2007 | |
| WO | 2010098540 | A2 | | 9/2010 | |

OTHER PUBLICATIONS

Translation of CN 113140898 A (Year: 2021).*

EESR of the corresponding EP Patent Application No. 22863477.0 dated Nov. 12, 2024.

(ISA/237) Written Opinion of the International Searching Authority dated Nov. 21, 2022.

The international search report of the corresponding PCT Application No. PCT/CN2022/115985 mailed on Nov. 21, 2022 along with English translation thereof.

* cited by examiner

ANTENNA ELEMENT AND ANTENNA ARRAY

CROSS-REFERENCE

The present application is the corresponding application of International Patent Application No. PCT/CN2022115985, filed on Aug. 30, 2022, to enter the national phase of the United States, which is based on and claims priority to Chinese Patent Application No. 202111040176.6, filed on Sep. 6, 2021, the entire content of which is hereby incorporated into the present application by reference.

TECHNICAL FIELD

Embodiments of the present application relate to the technical field of communication, in particular to an antenna element and an antenna array.

BACKGROUND

With the advent of 5G (5th Generation Mobile Communication Technology), Massive MIMO (Massive Multiple-Input Multiple-Output) antenna arrays require a more compact structure and a larger number of antenna array elements than previous 4G (4th Generation Mobile Communication Technology) antenna products. Among them, the element serves as the most important functional component inside the antenna, and the conventional element structure is complicated in design, large in volume, heavy in weight, many in machining and molding steps, and high in production cost.

Mainstream antenna elements are mainly divided into two categories:

One category of antenna elements is sheet metal, die-cast or PCB (Printed Circuit Board) elements that form a radiation unit, with the feed form being the PCB feed. The components are assembled separately and then assembled by screws and rivets into a complete machine. This form of antenna element is complicated to assemble due to the numerous elements of the antenna array.

The other category of antenna elements is based on plastic injection molding, laser engraving and electrochemical plating techniques, and feed network lines and radiation plates are attached to a plastic dielectric substrate after being processed by means of laser engraving and/or electrochemical plating. However, in practical production and application, the feed network lines and radiation plates in the antenna element are easy to be rough and the antenna loss is large, which affects the gain performance of the antenna.

SUMMARY

Some embodiments of the present application provide an antenna element, including a dielectric substrate, a radiation unit and a feed unit, wherein a first support column is arranged on the dielectric substrate, the radiation unit and the feed unit are of an integrally formed structure, at least one of the radiation unit and the feed unit is provided with a first through hole, the first support column passes through the first through hole, and the first support column and an inner wall of the first through hole are fixedly connected by means of hot melting.

Some embodiments of the present application also provide an antenna array, including a ground and a plurality of antenna elements as described above, wherein the plurality of antenna elements are arranged in an array on the ground, and the dielectric substrates of the plurality of antenna elements are of an integrated structure.

DETAILED DESCRIPTION

In order to make the objects, technical solutions and advantages of the embodiments of the present application clearer, various embodiments of the present application will be described in detail below with reference to the accompanying drawings. However, those of ordinary skill in the art can appreciate that in the various embodiments of the present application, numerous technical details are set forth in order to provide the reader with a better understanding of the present application. However, the technical solution claimed in the present application can be implemented without these technical details and with various variations and modifications based on the following embodiments. The following division of various embodiments is for convenience of description and should not be construed as limiting the specific implementations of the present application, and various embodiments can be referred to in conjunction with each other without contradiction.

Figure 1:
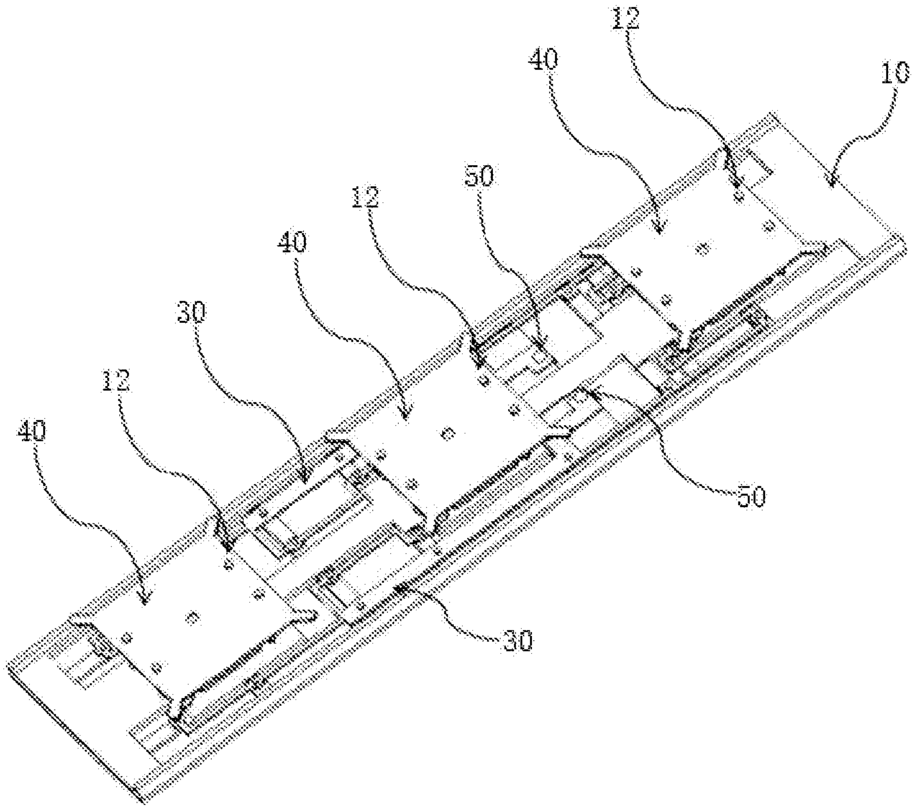
FIG. 1 is a structural schematic diagram of an antenna element according to some embodiments of the present application.
Figure 2:
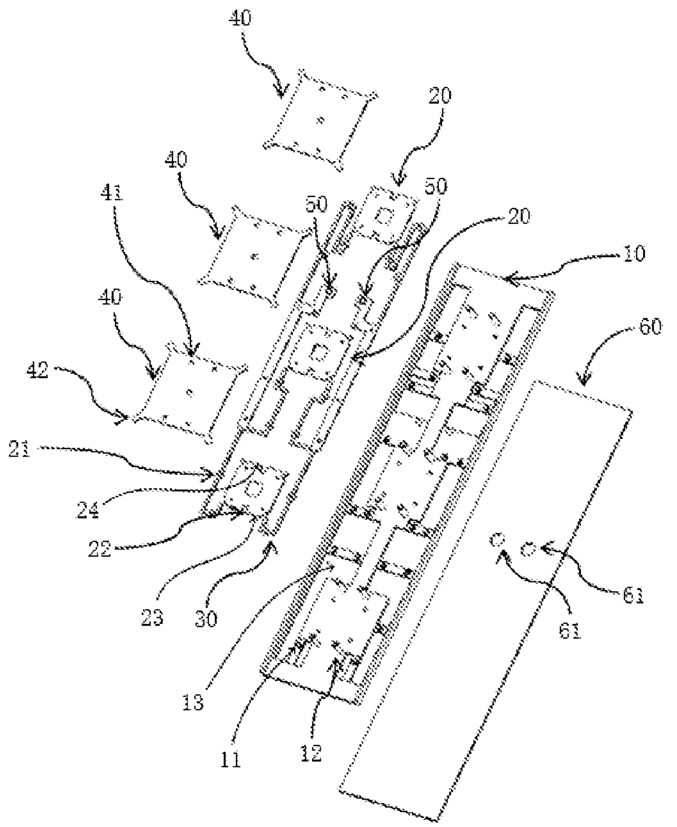
FIG. 2 is a schematic exploded view of the antenna element shown in FIG. 1.

FIG. 1 shows a structure of an antenna element according to some embodiments of the present application, and FIG. 2 is a schematic exploded view of the antenna element shown in FIG. 1. As shown in FIGS. 1 and 2, an antenna element provided by some embodiments of the present application includes a dielectric substrate 10, a radiation unit 20 and a feed unit 30, wherein a first support column 11 is arranged on the dielectric substrate 10, the radiation unit 20 and the feed unit 30 are of an integrally formed structure, at least one of the radiation unit 20 and the feed unit 30 is provided with a first through hole 21, the first support column 11 on the dielectric substrate 10 passes through the first through hole 21, and the first support column 11 on the dielectric substrate 10 and an inner wall of the first through hole 21 are fixedly connected by means of hot melting.

According to the antenna element provided by some embodiments of the present application, the radiation unit 20 and the feed unit 30 are of the integrally formed structure, at least one of the radiation unit 20 and the feed unit 30 is provided with the first through hole 21, the first support column 11 on the dielectric substrate 10 passes through the first through hole 21, and is fixedly connected with the inner wall of the first through hole 21 by means of hot melting, so as to realise assembly among the radiation unit 20 and the feed unit 30 and the dielectric substrate 10, so that the integrally formed radiation unit 20 and feed unit 30 and the dielectric substrate 10 can be assembled only by hot melting, and the assembly difficulty of the antenna element is reduced. At the same time, the radiation unit 20 and the feed unit 30 are of the integrally formed structure so as to avoid the feed network lines and radiation plates of the antenna element from being rough due to adoption of laser engraving or electrochemical plating, thereby reducing the loss of the antenna, and advantageously optimizing the gain performance of the antenna.

The dielectric substrate 10 is a fixing foundation for the radiation unit 20 and the feed unit 30, the radiation unit 20 is a signal radiation part of the antenna, and the feed unit 30 plays the role in feeding the radiation unit 20. Compared with the form that the components are independently manufactured and are assembled by connectors in turn, the radiation unit 20 and the feed unit 30 are of the integrally formed structure and are fixed to the surface of the dielectric substrate 10 by hot melting fit between the first support column 11 and the first through hole 21. In this way, the structural complexity and assembly difficulty caused by the sequential assembly of all components are eliminated. Here, integrally forming of the radiation unit 20 and the feed unit 30 can be achieved by stamping a metal coil, a metal material is stamped in a preset form to obtain the integrally formed radiation unit 20 and feed unit 30, and the first through hole 21 can be stamped in the part where the radiation unit 20 is located or the part where the feed unit 30 is located, or the parts where the radiation unit 20 and the feed unit 30 are located. Here, the radiation unit 20 and the feed unit 30 can also be obtained by digitally controlled lathing, and it is also possible to obtain the integrated radiation unit 20 and feed unit 30 having a smoother surface compared with laser engraving or electrochemical plating, so as to reduce the loss of the antenna. In addition, the first support column 11 on the dielectric substrate 10 can be shaped like a mushroom head after hot melting, and the hole wall of the first through hole 21 of the radiation unit 20 is fixed to the first support column 11, so that the radiation unit 20 and feed unit 30 of the integrally formed structure are fixed to the surface of the dielectric substrate 10.

In some embodiments, the radiation unit 20 can take the form of a patch, i.e., the rectangular patch as shown in FIG. 2, while in other embodiments the radiation unit 20 can also take the form of a circular patch or a diamond-shaped patch. In addition, the radiation unit 20 can also take the form of a microstrip line. The feed form of the radiation unit 20 can be coupled feed or direct feed, and the feed unit 30 is a feed metal strip as shown in FIG. 2. The feed metal strip and the rectangular patch are formed into an integrated structure by stamping metal coils, which can ensure the connection strength between the rectangular patch and the feed metal strip while ensuring the surface accuracy of the rectangular patch and the feed metal strip.

Since the radiation unit 20 and the feed unit 30 are fixed on the surface of the dielectric substrate 10, and the first support column 11 plays a role in preventing the radiation unit 20 and the feed unit 30 from being detached from the dielectric substrate 10 after hot melting, the number of the first support columns 11 on the dielectric substrate 10 and the number of the first through holes 21 in the integrally formed radiation unit 20 and feed unit 30 are not limited, and the number of the radiation units 20 can be designed as one, two, three or five according to actual needs. For example, the number of the radiation units 20 shown in FIG. 2 is three, the number of the feed metal strips integrally formed with the three radiation units 20 is two, the first through hole 21 is formed in the feed metal strip, the number of first through holes 21 in each feed metal strip is 11, and the number of the first support columns 11 on the dielectric substrate 10 is 22.

In some embodiments, the dielectric substrate 10 and the first support column 11 are made of plastic, and the first support column 11 and the dielectric substrate 10 are of an integrally formed structure, so that on the one hand, the weight of the antenna element can be reduced to achieve the light weight of the antenna element, and on the other hand, the connection strength between the first support column 11 and the dielectric substrate 10 can be increased to ensure the reliability when the radiation unit 20 and the feed unit 30 are fixed to the dielectric substrate 10. In other embodiments, the dielectric substrate 10 and the first support column 11 can be made of different materials.

In addition to the radiation unit 20, a parasitic unit 40 is also usually fixed to the dielectric substrate 10 to improve the bandwidth and gain performance of the antenna. The parasitic unit 40 is spaced apart from the radiation unit 20 to reflect the energy of the radiation unit 20, so that the signals of the radiation unit 20 are superimposed in a specific direction to be enhanced, and the specific direction is the direction in which the radiation unit 20 faces the parasitic unit 40. The fixing between the parasitic unit 40 and the dielectric substrate 10 can also take the form of hot melting of the support column. As shown in FIG. 2, the parasitic unit 40 can be provided with second through holes 41, and the dielectric substrate 10 can be provided with second support columns 12 such that the second support columns 12 pass through the second through hole 41 and are fixedly connected with the hole walls of the second through holes 41 by hot melting. In such a way, after the radiation unit 20 and the feed unit 30 are fixed to the dielectric substrate 10, the parasitic unit 40 can be fixed to the dielectric substrate 10 in the same manner. The diameter of the end away from the dielectric substrate 10 of the second support column 12 on the dielectric substrate 10 is smaller than the diameters of other parts of the second support column 12, and the diameter of the second through hole 41 in the parasitic unit 40 is larger than the diameter of the end away from the dielectric substrate 10 of the second support column 12 and smaller than the diameters of other parts of the second support column 12. When the second support column 12 on the dielectric substrate 10 passes through the second through hole 41, the parasitic unit 40 will be blocked at the end of the second support column 12 and cannot continue to be close to the surface of the dielectric substrate 10. Thus, after the end of the second support column 12 is subjected to hot melting to form the mushroom head shape, the parasitic unit 40 is fixed to the second support column 12, and the parasitic unit 40 is fixed to the end away from the dielectric substrate 10 of the second support column 12, and is spaced apart from the radiation unit 20 fixed to the surface of the dielectric substrate 10.

Similarly, the number of the second support columns 12 on the dielectric substrate 10 and the number of the second through holes 41 in the parasitic unit 40 are not limited. As shown in FIG. 2, the number of the second support columns 12 on the dielectric substrate 10 corresponding to the same one parasitic unit 40 can be four, and the four second support columns 12 are rectangularly arranged on the surface of the dielectric substrate 10 and avoid the mounting position of the radiation unit 20. The number of the second through holes 41 in the parasitic unit 40 is likewise four, the four second through holes 41 are likewise rectangularly arranged on the parasitic unit 40, and the parasitic unit 40 can be effectively fixed to the dielectric substrate 10 by the matching between the four second support columns 12 on the dielectric substrate 10 and the four second through holes 41 in the parasitic unit 40.

Meanwhile, the parasitic units 40 are in one-to-one correspondence to the radiation units 20, one parasitic unit 40 faces one radiation unit 20, the parasitic unit 40 can take the form of a metal patch, such as the rectangular metal patch shown in FIG. 2, while in other possible embodiments, the parasitic unit 40 can also take the form of a circular metal patch or a diamond-shaped metal patch.

Figure 3:
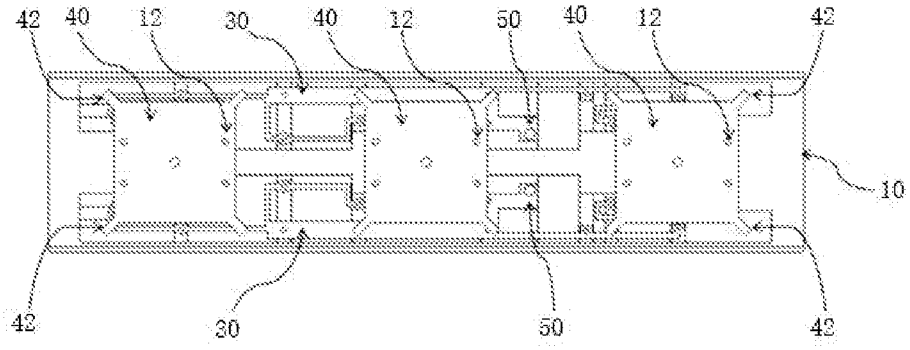
FIG. 3 is a schematic top view of the antenna element shown in FIG. 1.

In addition, in order to improve the bandwidth of the antenna, rectangular matching branches can be loaded on the periphery of the metal patch used as the parasitic unit 40. Such a rectangular matching branch is a protruding part arranged on the periphery of the metal patch, that is, as shown in FIG. 3, a protruding portion 42 can be arranged on the parasitic unit 40, and the protruding portion 42 extends outwards from the edge of the parasitic unit 40. Meanwhile, the protruding portion 42 can also take other forms, such as a cross shape or a ♀ shape.

In order to improve the gain performance of the antenna, as shown in FIG. 2, a plurality of hollowed-out regions 13 can be arranged on the dielectric substrate 10 at positions facing the feed units 30, each hollowed-out region 13 faces part of the surface of the feed unit 30, and the hollowed-out region 13 is a hollowed-out area formed in the dielectric substrate 10. By hollowing out the position facing the feed unit 30 on the dielectric substrate 10, the loss of the feed line can be reduced, thereby increasing the gain performance of the antenna. In addition, a certain debugging and optimization effect is achieved on the phase and standing wave of the antenna.

The hollowed-out region is arranged according to the position of the feed unit 30, and there may be multiple positions facing the dielectric substrate 10 of the feed unit 30 according to the number of the feed units 30. As shown in FIG. 2, the number of the feed units 30 is two, and the ±45° dual polarization of the radiation unit 20 can be achieved by the two feed units 30, so that there are two feed units 30 integrally formed with the radiation unit 20, and the two feed units 30 are symmetric about the radiation unit 20.

Figure 4:
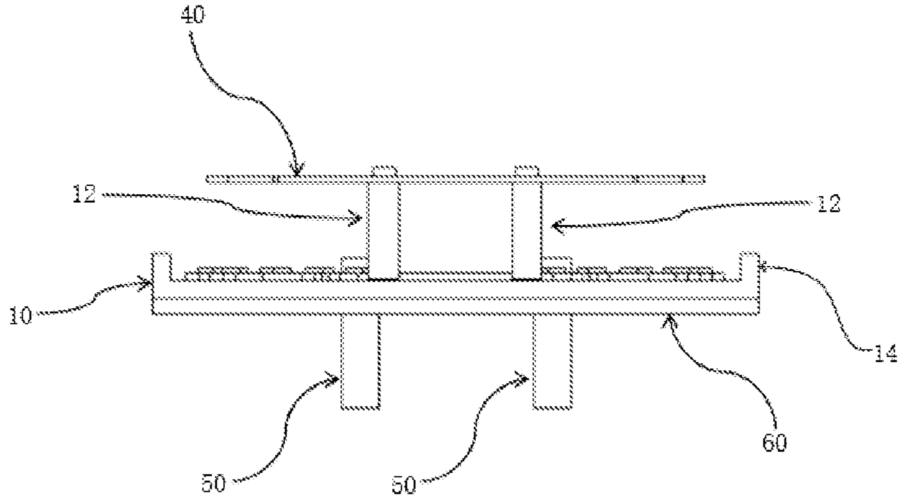
FIG. 4 is a schematic side view of the antenna element shown in FIG. 1.
Figure 5:
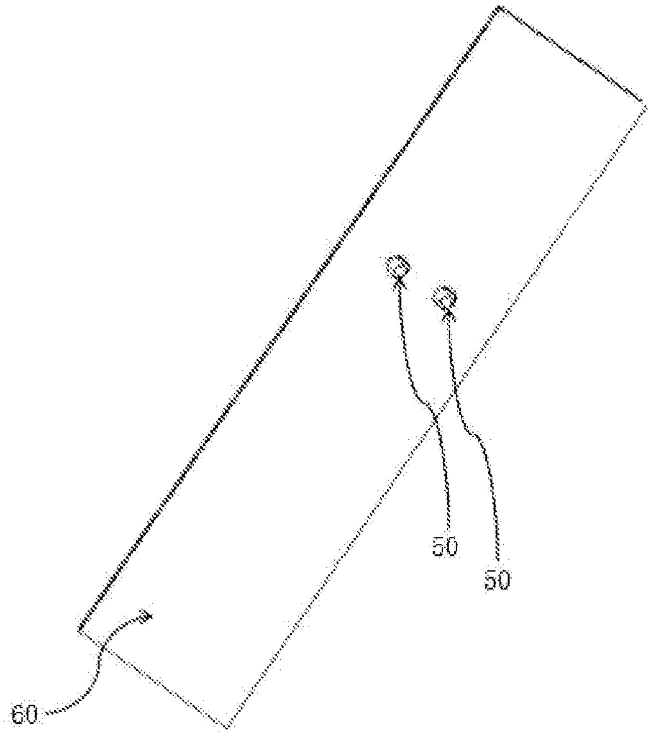
FIG. 5 is a structural schematic diagram of the antenna element in FIG. 1 at another viewing angle.

In addition, the feed unit 30 can communicate with the outside through a feed pin 50, and the feed pins 50 are in one-to-one correspondence to the feed units 30, penetrate through the dielectric substrate 10 and are electrically connected with the corresponding feed units 30. As shown in FIGS. 4 and 5, one end of the feed pin 50 is connected to an input end of the feed unit 30, and the other end of the feed pin 50 as the input end of the antenna element protrudes out of the surface away from the radiation unit 20 of the dielectric substrate 10 facing and penetrates through the ground 60 so that the feed pin 50 can be electrically connected to a calibration network of the antenna or a filter. Here, the input end of the feed unit 30 is the end electrically connected with the feed pin 50.

In some embodiments, the feed pin 50 can be a metal probe embedded in the dielectric substrate 10, when the dielectric substrate 10 is formed, the metal probe is embedded at a position corresponding to the input end of the feed unit 30, and after the integrally formed feed unit 30 and radiation unit 20 are fixed to the surface of the dielectric substrate 10 by means of hot melting, the metal probe is naturally electrically connected with the feed unit 30, thereby realising signal input.

In addition, the feed pin 50 is not limited to the form of a metal probe, and can also take the form of a radio frequency connector or the like. The feed pin 50 can be connected to an external signal source by means of welding or plugging.

Meanwhile, in order to improve the gain performance of the antenna, the surface current path of the radiation unit 20 can be increased, the radiation unit 20 has a first edge and a second edge that are opposite to each other, and the radiation unit 20 is provided with a notch 22 recessed from a first edge 23 to a second edge 24. The first edge 23 and the second edge 24 are the edges of the two opposite sides of the rectangular patch used as radiation unit 20 in FIG. 2, and the notch 22 can bend the surface current path of the radiation unit 20. In addition, the surface current path of the radiation unit 20 can also be increased by forming through holes in the radiation unit 20, and the gain performance of the antenna can also be improved.

In order to improve the radiation performance of the antenna, a flange 14 may be arranged on the dielectric substrate 10, and the flange 14 bends and extends from the edge of the dielectric substrate 10 to the side provided with the radiation unit 20. As shown in FIG. 4, two long sides of the rectangular dielectric substrate 10 are each provided with the flange 14, and the flange 14 can play a role in reflecting the signal of the radiation unit 20, thereby improving the radiation performance of the antenna.

Figure 6:
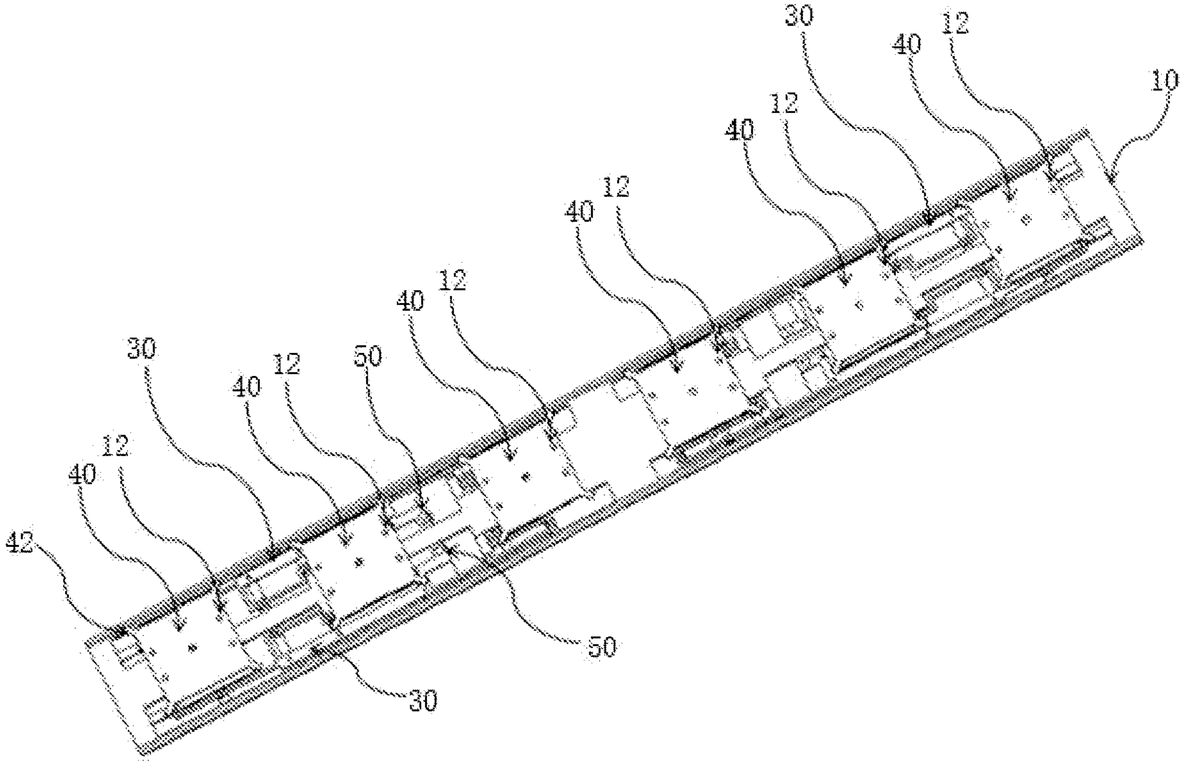
FIG. 6 is a structural schematic diagram of an antenna array according to some embodiments of the present application.
Figure 7:
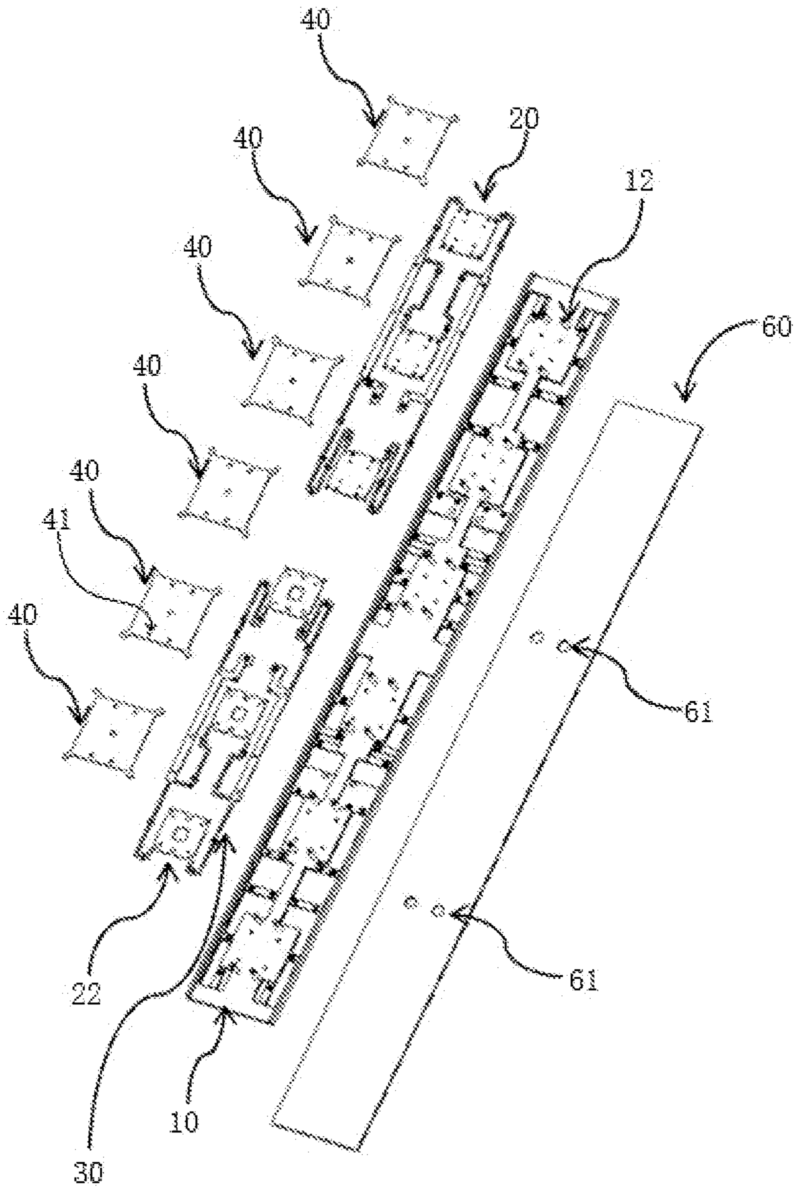
FIG. 7 is a schematic exploded view of the antenna array shown in FIG. 6.
Figure 8:
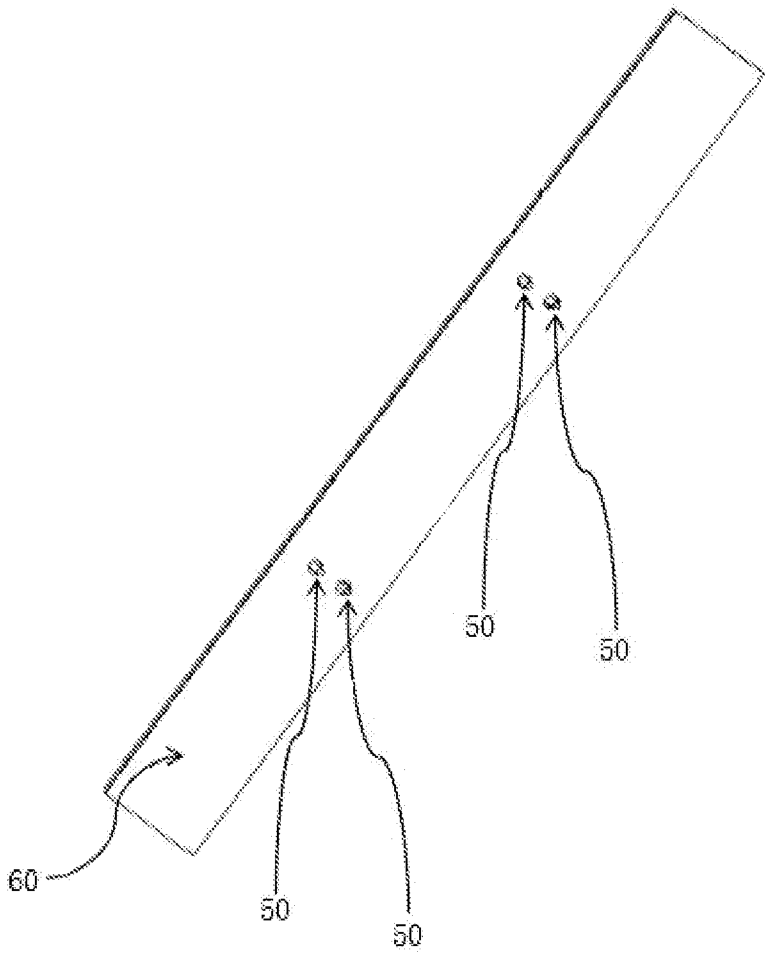
FIG. 8 is a structural schematic diagram of the antenna array shown in FIG. 6 at another viewing angle.

Some embodiments of the present application also provide an antenna array, as shown in FIGS. 6-8, including a ground 60 and a plurality of antenna elements in the above-described embodiments, wherein the plurality of antenna elements are arranged in an array on the ground 60, and the dielectric substrates 10 of the plurality of antenna elements are of an integrated structure. The antenna element shown in FIG. 6 includes three radiation units 20, and the antenna array shown in FIG. 6 shows a case where the antenna array includes two antenna elements, which is just one of the schematic structures of the antenna array here. In other possible embodiments, the antenna array can also include three or more antenna elements, and the number of the feed units 30 and the number of the feed pins 50 can each be four or more correspondingly.

When the antenna array is assembled, it is only necessary to arrange a preset number of antenna elements according to certain rules, such as the linear arrangement shown in FIG. 6, and it is not necessary to weld a feed network to the antenna array any longer. In this way, the production operation can be effectively simplified, the number of parts can be greatly reduced, the assembly and welding process of the whole antenna can be simplified, the assembly efficiency can be improved, and automated mass production can be facilitated.

The ground 60 serves as a metal ground layer arranged on the surface away from the radiation unit 20 of the dielectric substrate 10, in such a way, the ground 60 arranged on the dielectric substrate 10 serves as a reflector of the antenna array and the grounding end of the radiation unit 20, and there is no need to add a separate reflector, so that the cost can be reduced, and the weight of the antenna array can be reduced. Here, the ground 60 can reflect the electromagnetic wave signal for many times, thereby enhancing the signal receiving and transmitting efficiency of the radiation unit 20.

In addition, as shown in FIGS. 7 and 8, the ground 60 is provided with a third through hole 61 through which the feed pin 50 passes, and the feed pin 50 can pass through the third through hole 61 in the ground 60 to avoid the grounded short circuit of an input port of the feed pin 50.

It will be understood by those of ordinary skill in the art that the above-described embodiments are specific embodiments for carrying out the present application, and in practice, various changes in form and detail can be made therein without departing from the spirit and scope of the present application.

What is claimed is:

1. An antenna element, comprising a dielectric substrate (10), a radiation unit (20), a feed unit (30), and a parasitic unit (40), the dielectric substrate (10) being provided with a first support column (11), the radiation unit (20) and the feed unit (30) being of an integrally formed structure, at least one of the radiation unit (20) and the feed unit (30) being provided with a first through hole (21), the first support column (11) passing through the first through hole (21), the first support column (11) and an inner wall of the first through hole (21) being fixedly connected by means of hot melting, the parasitic unit (40) being provided with a second through hole (41), the dielectric substrate (10) being provided with a second support column (12), the second support column (12) passing through the second through hole (41), and the second support column (12) and an inner wall of the second through hole (41) being fixedly connected by means of hot melting, and the parasitic unit (40) being spaced apart from the radiation unit (20).

2. The antenna element according to claim 1, wherein:
the dielectric substrate (10) and the first support column (11) are made of plastic, and the first support column (11) and the dielectric substrate (10) are of an integrally formed structure.

3. The antenna element according to claim 2, wherein:
the dielectric substrate (10) is provided with a plurality of hollowed-out regions (13), and the hollowed-out regions (13) are arranged facing a surface of the feed unit (30).

4. An antenna array, comprising:
a ground (60) and a plurality of antenna elements according to claim 2, the plurality of antenna elements being arranged in an array on the ground (60), and the dielectric substrates (10) of the plurality of antenna elements being of an integrated structure.

5. The antenna element according to claim 1, wherein:
the parasitic unit (40) is provided with a protruding portion (42), and the protruding portion (42) extends outwards from an edge of the parasitic unit (40).

6. The antenna element according to claim 5, wherein:
the dielectric substrate (10) is provided with a plurality of hollowed-out regions (13), and the hollowed-out regions (13) are arranged facing a surface of the feed unit (30).

7. The antenna element according to claim 1, wherein:
the dielectric substrate (10) is provided with a plurality of hollowed-out regions (13), and the hollowed-out regions (13) are arranged facing a surface of the feed unit (30).

8. The antenna element according to claim 1, wherein:
a number of the feed units (30) is two, and the two feed units (30) are symmetric relative to the radiation unit (20).

9. The antenna element according to claim 8, wherein:
further comprising feed pins (50), the feed pins (50) being in one-to-one correspondence to the feed units (30), and the feed pins (50) penetrating through the dielectric substrate (10) and being electrically connected with the corresponding feed units (30).

10. The antenna element according to claim 1, wherein:
further comprising feed pins (50), the feed pins (50) being in one-to-one correspondence to the feed units (30), and the feed pins (50) penetrating through the dielectric substrate (10) and being electrically connected with the corresponding feed units (30).

11. The antenna element according to claim 1, wherein:
the radiation unit (20) has a first edge (23) and a second edge (24) that are arranged opposite to each other, and the radiation unit (20) is provided with a notch (22) which is recessed from the first edge (23) to the second edge (24).

12. The antenna element according to claim 1, wherein:
the dielectric substrate (10) is provided with a flange (14), and the flange (14) bends and extends from an edge of the dielectric substrate (10) to a side provided with the radiation unit (20).

13. An antenna array, comprising:
a ground (60) and a plurality of antenna elements according to claim 1, the plurality of antenna elements being arranged in an array on the ground (60), and the dielectric substrates (10) of the plurality of antenna elements being of an integrated structure.

14. The antenna element according to claim 1, wherein:
the dielectric substrate (10) is provided with a plurality of hollowed-out regions (13), and the hollowed-out regions (13) are arranged facing a surface of the feed unit (30).

* * * * *